United States Patent [19]

Watari

[11] Patent Number: 4,839,844
[45] Date of Patent: Jun. 13, 1989

[54] ORTHOGONAL TRANSFORMER AND APPARATUS OPERATIONAL THEREBY

[75] Inventor: Masao Watari, Tokyo, Japan
[73] Assignee: NEC Corporation, Tokyo, Japan
[21] Appl. No.: 177,799
[22] Filed: Apr. 6, 1988

Related U.S. Application Data

[63] Continuation of Ser. No. 56,017, Jun. 1, 1987, abandoned, which is a continuation of Ser. No. 599,119, Apr. 11, 1984, abandoned.

[30] Foreign Application Priority Data

Apr. 11, 1983 [JP] Japan ................................. 58-63186
Apr. 20, 1983 [JP] Japan ................................. 58-69474

[51] Int. Cl.$^4$ .............................................. G06F 15/332
[52] U.S. Cl. ................................................... 364/727
[58] Field of Search ...................... 364/727, 726, 725; 381/31

[56] References Cited

U.S. PATENT DOCUMENTS

| | | | |
|---|---|---|---|
| 3,881,097 | 4/1975 | Lehmann | 364/726 |
| 4,038,539 | 7/1977 | Van Cleave | 364/724 |
| 4,052,565 | 10/1977 | Baxter et al. | 364/727 |
| 4,446,530 | 5/1984 | Tsvboka | 364/725 |
| 4,495,620 | 1/1985 | Steele et al. | 381/31 |
| 4,510,578 | 4/1985 | Miyaguchi et al. | 364/725 |
| 4,554,629 | 11/1985 | Smith, Jr. | 364/725 |

OTHER PUBLICATIONS

Shum, "Speech Processing With Walsh–Hadamard Trans Forms" *IEEE Trans. on Audio & Electroacoustics* vol. Au-21, No. 3, Jun. 1973, pp. 174–179.

Primary Examiner—David H. Malzahn
Attorney, Agent, or Firm—Sughrue, Mion, Zinn, Macpeak, and Seas

[57] ABSTRACT

Apparatus for obtaining an orthogonal transformer for use in signal analysis. This apparatus is especially useful in cepstral analysis where vocal tract characteristics of a signal are separated from a sound source. A buffer memory 10 temporarily stores input time series data and an orthogonal transformation is carried out by an orthogonal transform means 20 by multiplying each predetermined data read sequentially out of the buffer memory 10 by a predetermined twiddle factor. A controller 30 is used to specify the data read out of the buffer memory 10 and for giving the twiddle factor a value of 1 and $r/2^l$ corresponding to the magnitude of the real and imaginary part of the twiddle factor. Cepstrum information is obtainable using simple hardware to analyze the data generated by the orthogonal transformer.

15 Claims, 9 Drawing Sheets

FIG. 1
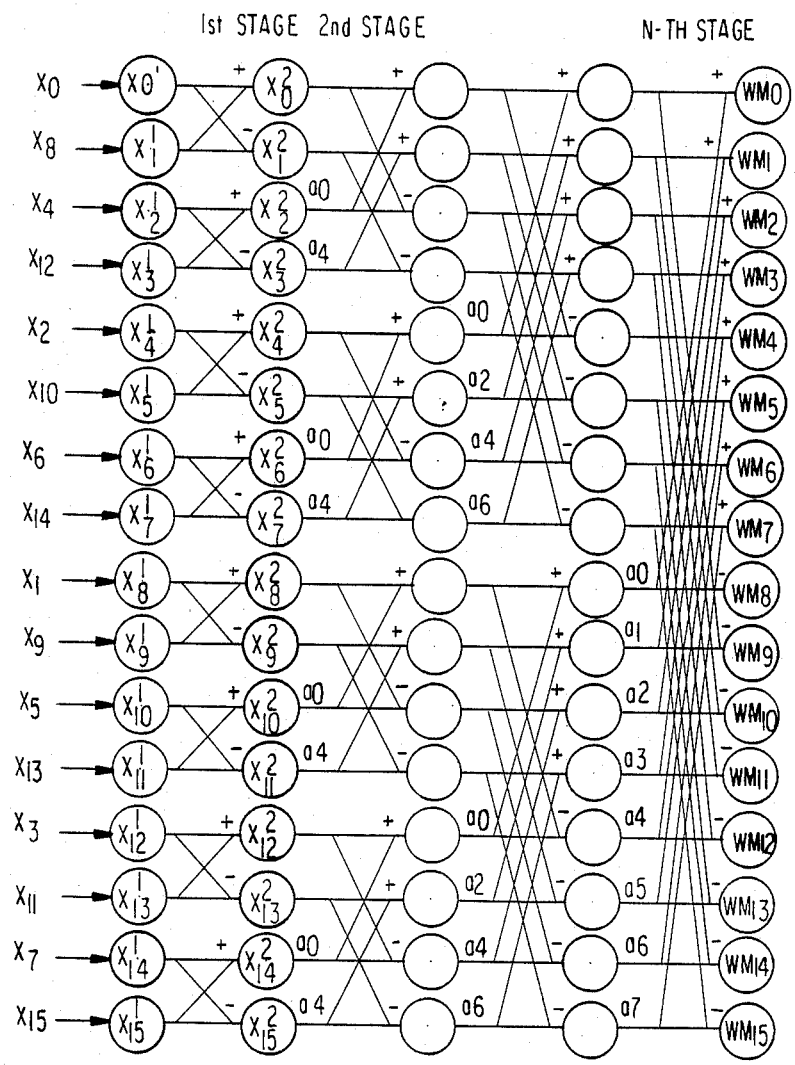
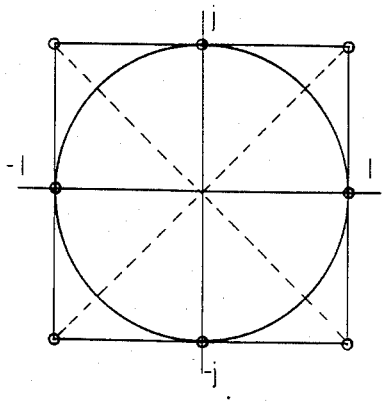
FIG. 2A
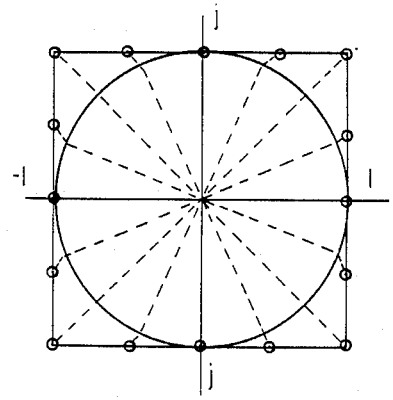
FIG. 2B

| k | INPUT OF 221 | | INPUT OF 222 | | FUNCTION OF 221 | FUNCTION OF 222 |
|---|---|---|---|---|---|---|
| | $A_R$ | $B_R$ | $A_I$ | $B_I$ | | |
| 0 | $X_{jR}$ | 0 | $X_{jI}$ | 0 | + | + |
| 1 | $X_{jR}$ | 0 | $X_{jI}$ | 0 | + | + |
| 2 | $X_{jR}$ | $X_{jI}$ | $X_{jR}$ | $X_{jI}$ | − | + |
| 3 | $X_{jR}$ | $X_{jI}$ | $X_{jR}$ | $X_{jI}$ | − | + |
| 4 | 0 | $X_{jI}$ | $X_{jR}$ | 0 | − | + |
| 5 | 0 | $X_{jI}$ | $X_{jR}$ | 0 | − | + |
| 6 | $X_{jR}$ | $X_{jI}$ | $X_{jR}$ | $X_{jI}$ | + & INV. | − |
| 7 | $X_{jR}$ | $X_{jI}$ | $X_{jR}$ | $X_{jI}$ | + & INV | − |

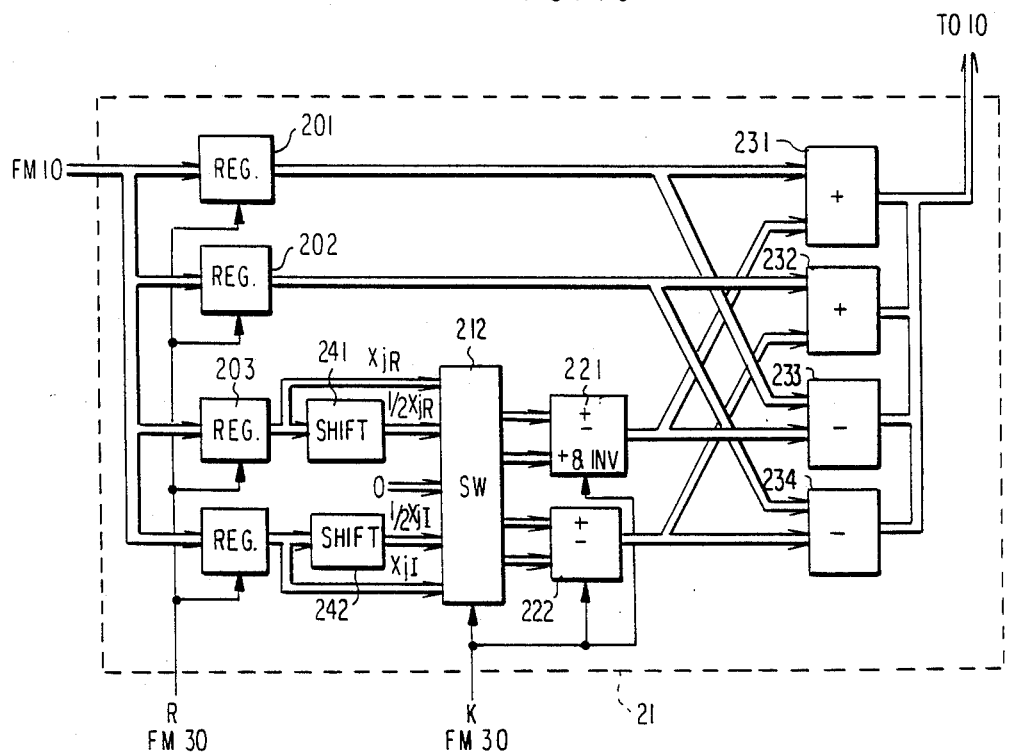

FIG. 12
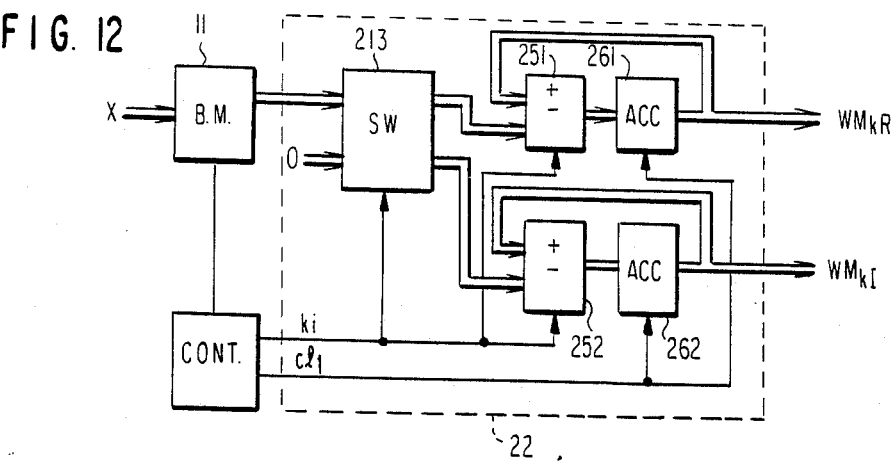
FIG. 13
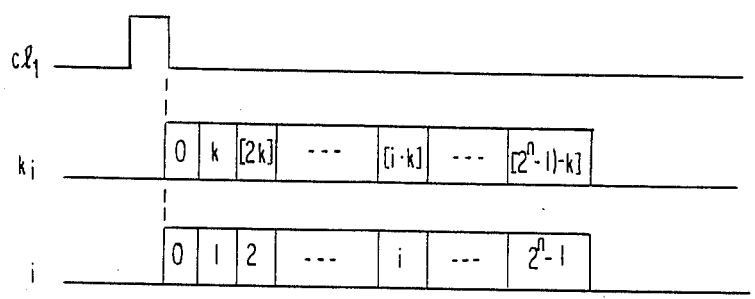
FIG. 14
| [k·i] | 251 INPUT | 252 INPUT | 251 FUNCTION | 252 FUNCTION |
|---|---|---|---|---|
| 0 | $X_i$ | 0 | + | + |
| 1 | $X_i$ | $X_i$ | + | + |
| 2 | 0 | $X_i$ | + | + |
| 3 | $X_i$ | $X_i$ | − | + |
| 4 | $X_i$ | 0 | − | + |
| 5 | $X_i$ | $X_i$ | − | − |
| 6 | 0 | $X_i$ | + | − |
| 7 | $X_i$ | $X_i$ | + | − |

| [K·i] | 251 INPUT | 252 INPUT | 251 FUNCTION | 252 FUNCTION |
|---|---|---|---|---|
| 0 | Xi | 0 | + | + |
| 1 | Xi | ½Xi | + | + |
| 2 | Xi | Xi | + | + |
| 3 | ½Xi | Xi | + | + |
| 4 | 0 | Xi | + | + |
| 5 | ½Xi | Xi | − | + |
| 6 | Xi | Xi | − | + |
| 7 | Xi | ½Xi | − | + |
| 8 | Xi | 0 | − | + |
| 9 | Xi | ½Xi | − | − |
| 10 | Xi | Xi | − | − |
| 11 | ½Xi | Xi | − | − |
| 12 | 0 | Xi | + | − |
| 13 | ½Xi | Xi | + | − |
| 14 | Xi | Xi | + | − |
| 15 | Xi | ½Xi | + | − |

ORTHOGONAL TRANSFORMER AND APPARATUS OPERATIONAL THEREBY

This is a continuation of application Ser. No. 056,017 filed June 1, 1987, now abandoned, which is a continuation of application Ser. No. 599,119, filed Apr. 11, 1984, now abandoned.

BACKGROUND OF THE INVENTION

This invention relates to an orthogonal transformer and an apparatus operational thereby.

To extract spectrum information from a voice signal, a Fourier transform is generally employed. However, a Fourier transform may function as an orthogonal transformer in a trigonometrical function system, and a multiplier is therefore required to perform the transformation which complicates the hardware configuration. On the other hand, the Walsh transform is available as another means for the orthogonal transformation. As an example of applying it to the spectrum analysis of a voice signal, there is presented a report by Hidafumi Ohga et al., "A Walsh-Hadamard Transform LSI For Speech Recognition", IEEE Transactions on Consumer Electronics, Vol. CE-28, No. 3, August 1982, pp. 263 to 270. The Walsh transform is a rough approximation to the Fourier transform, wherein as a twiddle factor (called "element of matrix" otherwise when expressed in matrix, the following description employing "twiddle factor") +1 and −1 are specified on the real axis, and thus a multiplication with the twiddle factor can be replaced by an addition and a subtraction to eliminate the multiplier and also to simplify the hardware configuration. The Walsh transform is described in detail in a report, "BIFORE or Hadamard Transform" by Nasir Ahmed, IEEE Transactions On Audio and Electroacoustics, September 1971, pp. 225 to 234. However, a trigonometrical function value in the Fourier transform as the twiddle factor is quantized in the Walsh transform to ±1 (trigonometric function value being replaced by ±1), which may result in a coarse quantization and a large quantizing error, and thus an approximation of the Fourier spectrum deteriorates.

SUMMARY OF THE INVENTION

An object of this invention is to provide an orthogonal transformer high in approximation and simple in hardware configuration.

Another object of this invention is to provide a signal analyzer which is simple in configuration and uses the above orthogonal transformer.

According to this invention, an orthogonal transformer comprises a buffer memory for storing an input time series data temporarily, an orthogonal transform means for carrying out orthogonal transformation by multiplying each predetermined data read sequentially out of the buffer memory by a predetermined twiddle factor, and a control means for specifying data read out of the buffer memory and giving the twiddle factor a value of 1 and $r/2^l$ (l being natural number including 0, and r being natural number including 0 determined for each l and $r \leq 2^l$) corresponding to the magnitude of its real part and imaginary part.

According to this invention, for example, cepstrum information, for example, will be obtainable with a simple hardware through analyzing a signal by the above-mentioned orthogonal transformer.

Further objects and features of this invention will be apparent from the following description with reference to the accompanying drawings.

BRIEF DESCRIPTION OF THE DRAWINGS

FIG. 1 is a diagram showing an arithmetic operation flow by an orthogonal transformer according to this invention.

FIGS. 2A and 2B are diagrams illustrating a twiddle factor used in the orthogonal transformer according to this invention.

FIG. 10 is a detailed block diagram representing another example of the orthogonal transform unit of FIG. 3.

FIG. 11 is a drawing showing a relation between the signal k and the inputs and operation functions of the operators 221 and 222 in FIG. 10.

FIG. 12 is a detailed block diagram representing a third example of the orthogonal transform unit of FIG. 3.

FIG. 13 is a timing chart of the unit shown in FIG. 12.

FIG. 14 is a drawing showing a relation between inputs and operation functions of operators 251 and 252.

DETAILED DESCRIPTION OF THE PREFERRED EMBODIMENTS

Figure 3:
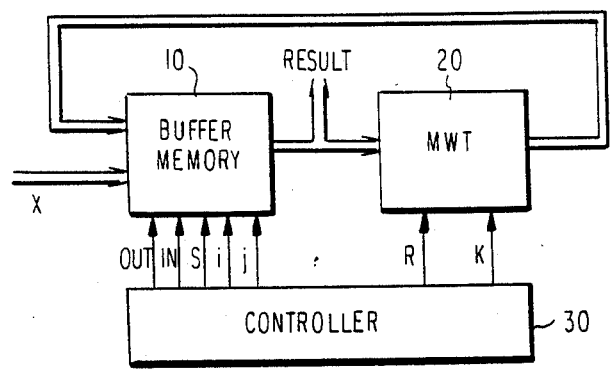
FIG. 3 is a basic black diagram of the orthogonal transformer according to this invention.

In order to eliminate the approximation deterioration caused by a Walsh transform, the present invention employs values of 1 and $r/2^l$ (l being natural number including 0, and r being natural number including 0 determined for each l and $r \leq 2^l$) as a real part and an imaginary part of the twiddle factor. More particularly, it will become clear in the manner which will presently be exemplified in conjunction with FIGS. 2A and 2B that the real part and the imaginary part of each twiddle factor have a first and a second absolute value, respectively, with the first and the second absolute values being varied in accordance with a formula $r/2^l$ when the second and the first absolute values are each equal to one, respectively, where l represents a predetermined integer which is not negative, namely, which is either equal to zero or is positive, and where r represents integers between zero and $2^l$, both inclusive. When each of the real part and the imaginary part is given at $\pm 1$ and 0, only addition and subtraction are sufficient for the Walsh transform. In the case of $r/2^l$ where the predetermined integer is not equal to zero, just adding one or more shifters makes it possible to perform the orthogonal transform without any multiplier.

The relation between the fast Fourier transform (FFT) and the fast Walsh transform (FWT) will now be explained. A method for representing FWT in matrix is given in a report by Nishitani "Consideration On Fourier Transform and Walsh Transform", Trans, IECE in Japan '76/12 Vol. 59-A No. 12, pp. 1,134 to 1,135. A column vector is defined as "X", and is formed by arranging an input time series in an inverse binary order according to the description given in the above report, a transform matrix is defined as "A", and a Fourier spectral vector is defined as "F". The inverse binary order refers to an order of the number obtained by inverting the digit of a natural number represented in binary. Where an input $X=(x_0, x_1, x_2, x_3, x_4, x_5, x_6, x_7)$ is arranged in the inverse binary order, for example, $X=(x_0, x_4, x_2, x_6, x_1, x_5, x_3, x_7)$. FWT can be represented as a n-time product as matrixes as:

$$F = A \cdot X = P_n \cdot P_{n-1} \cdots P_i \cdots P_1 \cdot X \qquad (1)$$

Here, each $P_i$ is determined according to Eqs. (2), (3), (4), (5).

$$P_i = B_i \otimes I_{n-1} \qquad (2)$$

$$B_i = \begin{pmatrix} I_{i-1} & D_{i-1} \\ I_{i-1} & -D_{i-1} \end{pmatrix} \qquad (3)$$

$$D_i = \text{diag}\,(1, a_i, a_i^2, \ldots, 2_i^{2^i-1}) \qquad (4)$$

$2^i$ pieces $$a_i = \exp(-j\pi/2^i), \qquad (5)$$

where represents a Kronecker's product, $I_i$ represents a unit matrix of $2^i$ lines or rows and $2^i$ columns, and diag ( ) represents a diagonal matrix with diagonal elements given in a pair of parentheses.

A flow of the arithmetic operation in Eq. (1) is shown in FIG. 1, and i represents the i-th stage of butterfly operation. Then, $P_1 \cdot X$ represents the butterfly operation at the first stage, $P_2 \cdot (P_1 \cdot X)$ represents the butterfly operation at the second stage, and similarly $P_i \cdot (P_{i-1} \cdots P_1 \cdot X)$ represents the butterfly operation at the i-th stage.

In the case where $n=3$, $P_1$, $P_2$, and $P_3$ are expressed by $$P_1 = \begin{bmatrix} 1 & 1 & & & & & & \\ 1 & -1 & & & & & & \\ & & 1 & 1 & & & & \\ & & 1 & -1 & & & & \\ & & & & 1 & 1 & & \\ & & & & 1 & -1 & & \\ & & & & & & 1 & 1 \\ & & & & & & 1 & -1 \end{bmatrix}$$

$$P_2 = \begin{bmatrix} 1 & & 1 & & & & & \\ & 1 & & a^2 & & & & \\ 1 & & -1 & & & & & \\ & 1 & & -a^2 & & & & \\ & & & & 1 & & 1 & \\ & & & & & 1 & & a^2 \\ & & & & 1 & & -1 & \\ & & & & & 1 & & -a^2 \end{bmatrix}$$

$$P_3 = \begin{bmatrix} 1 & & & & 1 & & & \\ & 1 & & & & a & & \\ & & 1 & & & & a^2 & \\ & & & 1 & & & & a^3 \\ 1 & & & & -1 & & & \\ & 1 & & & & -a & & \\ & & 1 & & & & -a^2 & \\ & & & 1 & & & & -a^3 \end{bmatrix}$$

where a blank indicates a zero, and $a = \exp(-\pi/4\,j)$. The number of elements which are not zero comes in two in each line, representing the butterfly operation.

Similarly, let it be assumed that a column vector arranging an input time series in the inverse binary order is X, a transform matrix is C, and a column vector of Walsh spectrum is W, then FWT can be represened in an n-time product of matrixes as:

$$X = C \cdot X = G_n \cdot G_{n-1} \cdots G_1 \cdot X \qquad (6)$$

where each $G_i$ is determined according to Eqs. (7), (8), (9).

$$G_i = E_i \otimes I_{n-i} \qquad (7)$$

$$E_i = \begin{vmatrix} I_{i-1} & L_{i-1} \\ I_{i-1} & -L_{i-1} \end{vmatrix} \qquad (8)$$

$$L_i = \text{diag}\,(1, 1, \ldots 1, -1, -1, \ldots, -1) \qquad (9)$$

$2^{i-1}$ pieces $\quad 2^{i-1}$ pieces

In case $n=3$, Walsh spectrum $W=(W_0, W_1, W_2, W_3, W_4, W_5, W_6, W_7)$. Operations $G_1$, $G_2$, $G_3$ are expressed as follows:

$$G_1 = P_1$$

$$G_2 = \begin{bmatrix} \begin{matrix} 1 & 1 \\ 1 & -1 \\ 1 & -1 \\ 1 & 1 \end{matrix} & & \\ & \begin{matrix} 1 & 1 \\ 1 & -1 \\ 1 & -1 \\ 1 & 1 \end{matrix} \end{bmatrix}$$

$$G_3 = \begin{bmatrix} \begin{matrix} 1 & & & 1 \\ & 1 & & 1 \\ & & 1 & -1 \\ 1 & & -1 & \end{matrix} & \\ & \begin{matrix} 1 & & & 1 \\ & 1 & & -1 \\ & & 1 & -1 \\ & & & 1 \end{matrix} \end{bmatrix}$$

As described above, in the FWT it is conceivable that a twiddle factor $a_i^k$ of $D_i$ in the FFT equal to $\exp(-j\theta)$, can be replaced as:

$$a_i^k \to 1 \text{ when } 0 \leq \theta < \frac{\pi}{2},$$

$$a_i^k = \to -1 \text{ when } \frac{\pi}{2} \leq \theta < \pi.$$

Thus, the Walsh transform trigonometrical function value is quantized to ±1 and utilized as the twiddle factor in the Fourier transform, however, since the quantization is coarse as described hereinabove, a high precision transform is not obtainable.

Thus, in the present invention, the real part and the imaginary part of the twiddle factor ±1 and ±$r/2^l$ are permitted. In other words, a so-called multiple valued twiddle factor is permitted. A relationship between the twiddle factors in the Fourier transform (FT), the Walsh transform (WT) and a transform according to this invention (hereinafter called multiple valued Walsh transform MWT) is shown in FIG. 2. The twiddle factor in FT takes a value on unit circle, the twiddle factor in WT takes values +1 and −1 on a real axis, on the other hand, the twiddle factor in MWT takes values ±1 and ±$r/2^l$ on the real and imaginary axes. FIG. 2A represents an example of 8 twiddle factors of a MWT, and FIG. 2B represents an example of 16 twiddle factors. It will readily be understood that the predetermined integer is equal to zero in FIG. 2A and to one in FIG. 2B.

In an 8 valued fast MWT (abbreviated as FMWT) according to this invention Eq. (5) of the procedures (1) to (5) in FFT is replaced by four pieces or elements below (13). An arithmetic operation of FMWT is expressed as follows:

$$F = P_n \cdot P_{n-1} \cdot \ldots \cdot P_i \cdot X \tag{10}$$

$$P_i = B_i \otimes I_{n-1} \tag{11}$$

$$B_i = \begin{pmatrix} I_{i-1} & D_{i-1} \\ I_{i-1} & -D_{i-1} \end{pmatrix} \tag{12}$$

$$D_i = \text{diag. } (1, [a_i], [a_i^2], \ldots, [a_i^{2^{i-1}}]) \tag{13}$$

where, assuming $a_i = \exp(-j\pi 2^i)$, $a_i^k = e^{j\theta}$, $$\begin{aligned}
[e^{j\theta}] &= 1, \text{ when } 0 \leq \theta < \frac{\pi}{4}, \\
&= 1 + j, \text{ when } \frac{\pi}{4} \leq \theta < \frac{\pi}{2} \\
&= j, \text{ when } \frac{\pi}{2} \leq \theta < \frac{3\pi}{4}, \\
&= -1 + j, \text{ when } \frac{3}{4}\pi \leq \theta < \pi.
\end{aligned}$$

The twiddle factors in the actual MWT are given as $(1, 1+j, -1+j, -1, -1-j, -j, 1-j)$, however, they can be substituted by four-piece twiddle factors through inversion as shown above.

Similarly, the twiddle factors in the 16 valued MWT are given as $(1, 1+\frac{1}{2}j, 1+j, \frac{1}{2}+j, j, -\frac{1}{2}+j, -1+j, -1+\frac{1}{2}j, -1, -1-\frac{1}{2}j, -1-j, -\frac{1}{2}-j, \frac{1}{2}-j, 1-j, 1-\frac{1}{2}j)$, however, $D_i$ uses 8 pieces following Eq. (14).

$$D_i = \text{diag. } (1, [a_i], [a_i^2], \ldots, [2_i^{2^{i-1}}]) \tag{14}$$

where
$$\begin{aligned}
[e^{j\theta}] &= 1, \text{ when } 0 \leq \theta < \frac{\pi}{8} \\
&= 1 + \frac{1}{2}j, \text{ when } \frac{\pi}{8} \leq \theta < \frac{\pi}{4}, \\
&= 1 + j, \text{ when } \frac{\pi}{4} \leq \theta < \frac{3\pi}{8} \\
&= \frac{1}{2} + j, \text{ when } \frac{3\pi}{8} \leq \theta < \frac{\pi}{2} \\
&= j, \text{ when } \frac{\pi}{2} \leq \theta < \frac{5\pi}{8}, \\
&= -\frac{1}{2} + j, \text{ when } \frac{5\pi}{8} \leq \theta < \frac{3\pi}{4} \\
&= -1 + j, \text{ when } \frac{3\pi}{4} \leq \theta < \frac{7\pi}{8} \\
&= -1 + \frac{1}{2}j, \text{ when } \frac{7\pi}{8} \leq \theta < \pi.
\end{aligned}$$

Next, a configuration of the apparatus according to this invention will be described with reference to the accompanying drawings.

As illustrating in FIG. 3, the orthogonal transformer according to this invention comprises basically a buffer memory 10 for storing an input time series complex number signal X, an orthogonal transform unit (MWT) 20 for carrying out the arithmetic operation of the multiple valued Walsh transform (MWT) proposed above, and a control unit 30 for outputting control signals for controlling the buffer memory 10 and the orthogonal transform unit 20.

Figure 4:
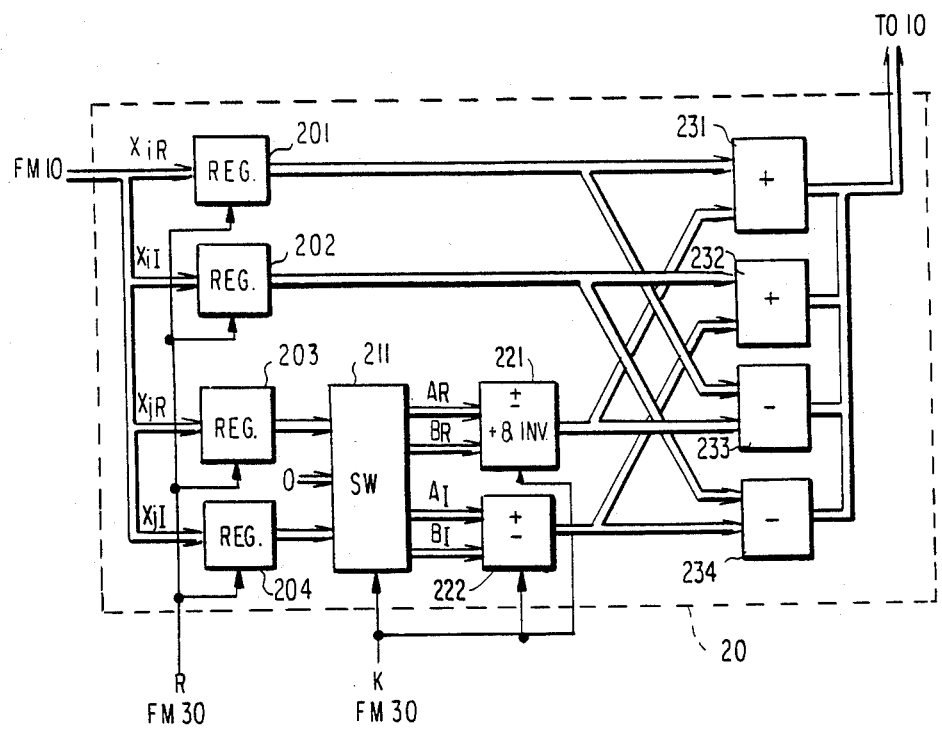
FIG. 4 is a detailed block diagram representing one example of an orthogonal transformer unit in FIG. 3.

One example of the orthogonal transform unit 20 for carrying out the 8 valued MWT is described with reference to FIG. 4. FIG. 4 shows a configuration for carrying out the arithmetic operations shown in FIG. 1 and Eqs. (10) to (13), wherein the orthogonal transform unit 20 performs an arithmetic operation by each butterfly circuit.

A general type of butterfly circuit in FFT is that used for obtaining two outputs $y_i$, $y_j$ from two inputs $x_i$, $x_j$ through Eq. (15), therefore a multiplier for multiplication by a twiddle factor $a_k$ will be required.

$$\begin{cases} y_i = x_i + x_j \cdot a_k \\ y_j = x_i - x_j \cdot a_k \end{cases} \quad (15)$$

When $a_k = \pm 1$ in this invention, the transform unit constitutes an adder and substracter only. Even in case $a_k = r/2^l$, since a half value is obtainable through shifting the data by one bit, a multiplier is not required when using shifters combined properly with each other.

Referring now to FIG. 3, time series complex number data $x_0, x_1, \ldots, x_{2n-1}$ are inputted to the buffer memory 10, rearranged in a inverse binary order and then stored temporarily in response to a signal IN from the control unit 30. In the case of $2^4 = 16$ pieces of time series data, for example, they are stored temporarily as data $x_0^1, x_1^1, x_2^1, \ldots, x_{15}^1$ in the order of $x_0, x_8, x_4, x_{12}, x_2, x_{10}, x_6, x_{14}, x_1, x_9, x_5, x_{13}, x_3, x_{11}, x_7, x_{15}$. The orthogonal transform or MWT according to this invention is a process for carrying out $2^{n-1}$ butterfly arithmetic operations, as shown in FIG. 1, at each stage from the first stage to the n-th stage. Consequently, signals $m(1, 2, \ldots, m, \ldots, n)$ specifying each stage and signals $l(0, 1, \ldots, 2^{n-m}-1)$, $k'(0, 1, \ldots, x^{m-l}-1)$ specifying a predetermined butterfly operation are generated in the control unit 30 at a timing shown in FIG. 7, and signals i, j, k which are determined by Eqs. (16) to (18) are supplied to the buffer memory 10 and the MWT unit 20 from the control unit 30. Here, the signals i and j specify two inputs $x_i, x_j$ of the butterfly operation. The signal k specifies a kind of the butterfly operation or determines its twiddle factor.

$$i = 2^m \cdot l + k' \quad (16)$$

$$j = i + 2^{m-1} \quad (17)$$

$$l = 2^{n-m} \cdot k' \quad (18)$$

Figure 5:
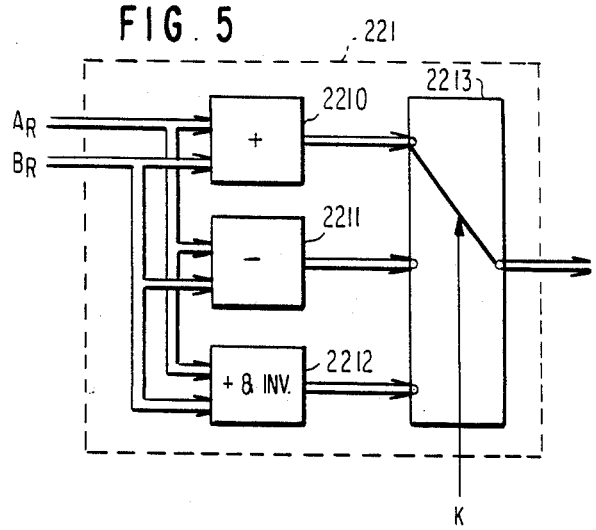
FIG. 5 and FIG. 6 are block diagrams representing one example of operators 221 and 222 in FIG. 4.
Figure 6:
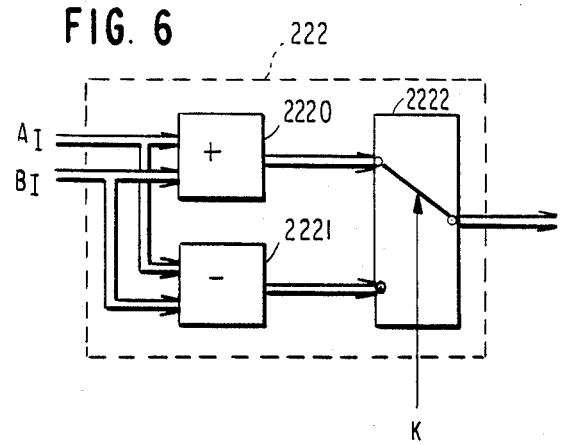

Two outputs $x_i^{m+1}$, $x_j^{m+1}$ of the butterfly operation circuit specified by the signals l and k' at the m-th stage are expressed as:

$$x_i^{m+1} = x_i^m + x_j^m \cdot a_k \quad (19)$$

$$x_j^{m+1} = x_i^m - x_j^m \cdot a_k \quad (20)$$

where $x_i^m$, $x_j^m$ are the two inputs of the butterfly operation circuit. The operation is obtainable through the following procedure:

Referring to FIG. 4, the signals $x_i^m$, $x_j^m$ are read out of the buffer memory 10 according to the signals i, j from the control unit 30, and the real parts $x_{iR}$, $x_{jR}$ and the imaginary parts $x_{iI}$, $x_{jI}$ are stored in registers 201, 203 and 202, 204 respectively in response to a signal R from the control unit 30. Then the butterfly operation specified by the signal k is carried out in the orthogonal transform unit 20. An addition or a subtraction is performed in the operators 221 and 222 according to the signal k. The operator 221 further performs an inversion after an addition operation in accordance with the signal k. As shown in FIGS. 5 and 6, for example, the operator 221 comprises an adder 2210, a combination of an adder and a subtractor 2211, an inverter 2212, and a switch 2213, while the operator 222 comprises an adder 2220, a subtractor 2221, and a switch 2222. The switches 2213 and 2222 select predetermined inputs according to the signal k. It will shortly become clear that the words "inversion" and "inverter" relate to signs, namely, from plus to minus and from minus to plus.

Figures 8, 9:
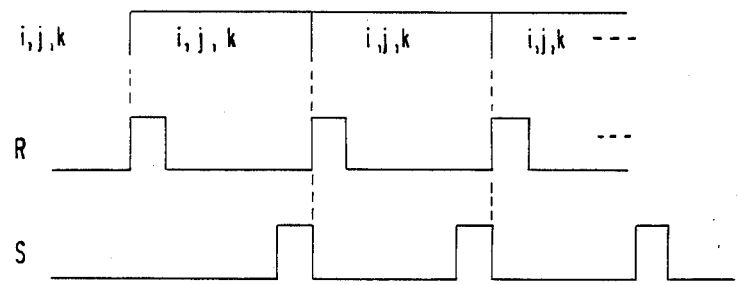
FIG. 8 is a drawing showing a relation between a signal k and the inputs and operation functions of the operators 221 and 222 in FIG. 4.
FIG. 9 is a diagram showing the timing relation between signals i, j, k, R and S supplied from the control unit 30 illustrated in FIG. 3.

As shown in FIG. 6, predetermined signals are selected by a switch 211 operating in accordance with the signal k out of output signals of the registers 203, 204 and "0" signal as inputs $A_R$, $B_R$ and $A_I$, $B_I$ of the operators 221 and 222, respectively. This selective operation, and the relationship between the switch 211, the function of the operators 221, 222, and the signal k is shown in FIG. 8. Namely, inputs of the operators 221, 222 and functions (kind of arithmetic operation, namely addition, subtraction, addition and then inversion) of the operators 221, 222 are selected by the switch 211 controlled by the signal k. Thus, the real part and the imaginary part of $x_j^m \cdot a_k$ are obtained as outputs $Z_R$ and $Z_I$ of the operators 221 and 222, respectively. Specifically, with $(Z_R + jZ_I) = (x_{jR} + jK_{jI}) \cdot a_k$, four kinds of additions and subtractions are executed as:

$a_k = 0$ when $k = 0$ or 1, $$\begin{cases} Z_R = x_{jR} \\ Z_I = x_{jI} \end{cases} \quad (21)$$

$a_k = 1 + j$ when $k = 2$ or 3, $$\begin{cases} Z_R = x_{jR} - x_{jI} \\ Z_I = x_{jR} + x_{jI} \end{cases} \quad (22)$$

$a_k = j$ when $k = 4$ or 5, $$\begin{cases} Z_R = -x_{jI} \\ Z_I = x_{jR} \end{cases} \quad (23)$$

$a_k = -1 + j$ when $k = 6$ or 7, $$\begin{cases} Z_R = -x_{jR} - x_{jI} \\ Z_I = x_{jR} - x_{jI} \end{cases} \quad (24)$$

Then the addition and subtraction of Eqs. (19), (20) are carried out by adders 231, 232 and subtracters 233, 234 for the real part and the imaginary part of the two outputs $x_i^{m+1}$ and $x_j^{m+1}$. Results $x_i^{m+1}$ and $x_j^{m+1}$ thus obtained are written in the portion of the buffer memory 10 where $x_i^m$ and $x_j^m$ are stored in response to a timing of signal S from the control unit 30. FIG. 9 shows the relationship between the signals i, j, k, the signal R for writing data from the buffer memory 10 into the registers 201 to 204, and the signal S for writing outputs of the operators (adders or subtracters) 231 to 234 into the buffer memory 10. FIG. 9 thus represents a state wherein a result obtained through carrying out the butterfly operation specified by the signal k at every output of the signal R on data signals specified by the signals i and j is written into the buffer memory 10 at a timing of the signal S.

Next, a sequence in which each butterfly operation is executed will be described concretely with reference to the case where n = 4. With m = 1, the butterfly operation at the first stage is executed with l = 0, 1, . . . , 7, and k' = 0. In other words, i and j take values (0, 1), (2, 3), . . . , (14, 15) in sequence, and k is 0. Then, l changes as 0, 1, . . . , 3 at the second stage consecutively, and k' takes values of 0 and 1 for each l. That is, values of i, j, k are (0, 2, 0), (1, 3, 4), (4, 6, 0), (5, 7, 4), . . . , (12, 14, 0), (13, 15, 4). At the fourth and final stage, l is 0 and k' changes as 0, 1, . . . , 7. Namely, values of i, j, k are (0, 8, 0), (1, 9, 1), . . . , (7, 15, 7).

Generally at the m-th stage, l changes as 0, 1, . . . , $2^{n-m}-1$, and k' changes as 0, 1, . . . , $2^{m-1}$ for each l. In other words, values of i, j, k take (0, $2^{m-1}$, 0), (1, $2^{m-1}+1$, $2^{n-m}$), . . . , ($2^{m-1}-1$, $2^m-1$, $2^{n-1}-2^{n-m}$), . . . , ($2^m$, $2^m+2^{m-1}$, 0), ($2^m+1$, $2^m+2^{m-1}+1$, $2^{n-m}$), . . . , ($2^m+2^{m-1}-1$, $2^{2m}-1$, $2^{n-1}-2^{n-m}$), . . . , ($2^n-2^m$, $2^n-2^{m-1}$, 0), ($2^n-2^m+1$, $2^n-2^{m-1}+1$, $2^{n-m}$), . . . , ($2^n-2^{m-1}-1$, $2^n-1$, $2^{n-1}-2^{n-m}$).

Figure 7:
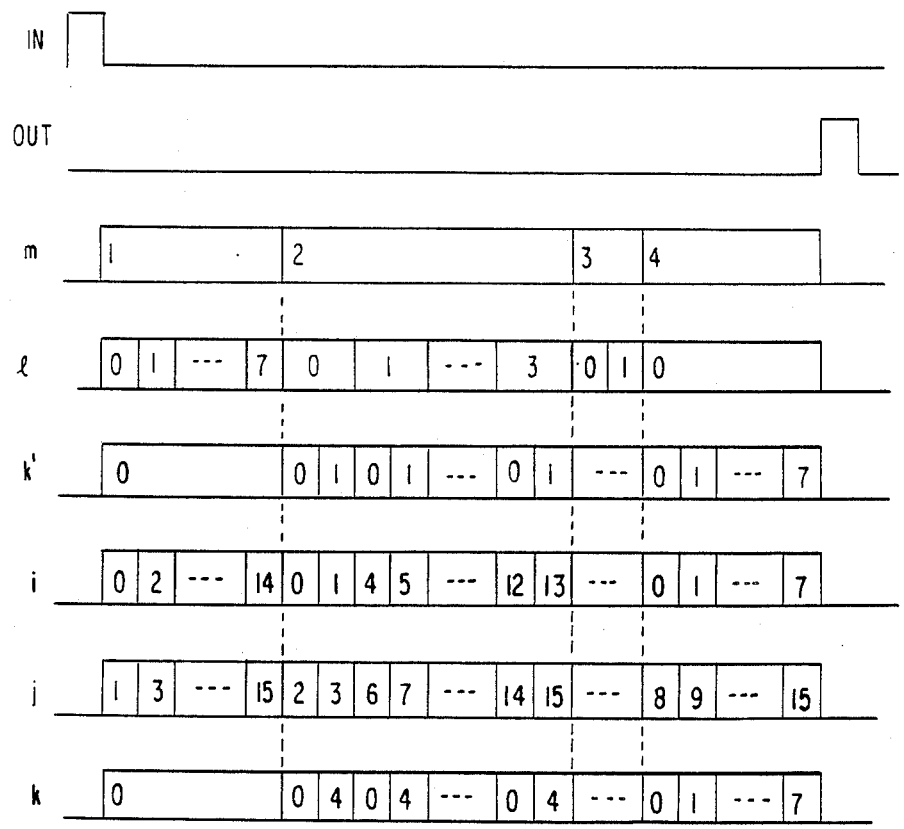
FIG. 7 is a timing chart of the unit shown in FIG. 4.

At the time point when the butterfly operation at the final stage has been executed, the multiple valued Walsh transformed values $WM_0$, $WM_1$, . . . , $WM_{2n-1}$ are stored in the buffer memory 10, and a result is outputted according to a read signal OUT shown in FIG. 7.

FIG. 10 represents a configuration of a 16 valued Walsh transform unit given at another embodiment of this invention. What is different from the configuration of FIG. 4 is that a value of the twiddle factor in the butterfly operation comes in eight kinds, shifters 241 and 242 are provided for obtaining a half-value data of the data from the registers 203 and 204, and a switch 212 is provided for selective operation. It is well known in the art that a half-valued data of a particular datum is obtained when binary bits representative of the particular datum are rightward shifted each by one bit.

A complex number multiplication for $x_j^m \cdot a_k$ is obtained by the orthogonal transform unit 21 through the following 8-way operation. As in the case of the above embodiment, $a_k$ is determined by k which is obtained through Eq. (18).

Where $(Z_R + jZ_I) = (x_{jR} + jx_{jI}) \cdot a_k$:
$a_k = 1$ when $k = 0$, $$\begin{cases} Z_R = x_{jR} \\ Z_I = x_{jI} \end{cases} \quad (25)$$

$a_k = 1 + \tfrac{1}{2}j$ when $k = 1$, $$\begin{cases} Z_R = x_{jR} - \tfrac{1}{2}x_{jI} \\ Z_I = \tfrac{1}{2}x_{jR} + x_{jI} \end{cases} \quad (26)$$

$a_k = 1 + j$ when $k = 2$, $$\begin{cases} Z_R = x_{jR} - x_{jI} \\ Z_I = x_{jR} + x_{jI} \end{cases} \quad (27)$$

$a_k = \tfrac{1}{2} + j$ when $k = 3$, $$\begin{cases} Z_R = \tfrac{1}{2}x_{jR} - x_{jI} \\ Z_I = x_{jR} + \tfrac{1}{2}x_{jI} \end{cases} \quad (28)$$

$a_k = j$ when $k = 4$, $$\begin{cases} Z_R = -x_{jI} \\ Z_I = x_{jR} \end{cases} \quad (29)$$

$a_k = -\tfrac{1}{2} + j$ when $k = 5$, $$\begin{cases} Z_R = -\tfrac{1}{2}x_{jR} - x_{jI} \\ Z_I = x_{jR} - \tfrac{1}{2}x_{jI} \end{cases} \quad (30)$$

$a_k = -1 + j$ when $k = 6$, $$\begin{cases} Z_R = -x_{jR} - x_{jI} \\ Z_I = x_{jR} - x_{jI} \end{cases} \quad (31)$$

$a_k = -1 + \tfrac{1}{2}j$ when $k = 7$, $$\begin{cases} Z_R = -x_{jR} - \tfrac{1}{2}x_{jI} \\ Z_I = \tfrac{1}{2}x_{jR} - x_{jI} \end{cases} \quad (32)$$

The above operations are obtained through the operation of the shifters 241 and 242, the switch 212, the operators 221 and 222 under the control of the control unit 30. Namely, the shifters 241 and 242 obtain $\tfrac{1}{2}x_{jR}$ and $\tfrac{1}{2}x_{jI}$ by shifting one bit, the switch 212 selects predetermined data out of $x_{jR}$, $x_{jI}$, $\tfrac{1}{2}x_{jR}$, $\tfrac{1}{2}x_{jI}$ and 0 as inputs of the operators 221 and 222, the operator 222 carries out addition or subtraction, and the operator 221 carries out addition, subtraction or inversion after addition. Through these operations of the above-mentioned Eqs. (25) to (32) are executed. The relationship between the signal k, inputs and the functions of the operators 221 and 222 are shown in FIG. 11.

As in the case of FIG. 4, the addition and subtraction are carried out by the adders 231 and 232, and subtracters 233 and 234, and the results are written into the buffer memory 10. Results obtained after processing at the n-th stage that is final are spectrums $WM_1$ to $WM_{16}$ subjected to the 16 valued Walsh transform.

Reviewing FIGS. 1 through 11, it should be understood that the control unit 30 produces the signals i, j, and R collectively as a read signal on specifying the data which should be read out of the buffer memory 10 and subjected to the butterfly computation or calculation in the orthogonal transform unit 20 or 21. The control unit 30 produces the signal k as a control signal on varying the absolute value of the real and the imaginary parts of the twiddle factors. In the orthogonal transform unit 20, a butterfly computation or calculation circuit is preformed by a combination of the switch 211, the operators 221 and 222, two adders 231 and 232, and two subtracters 233 and 234. In the orthogonal transform unit 21, such a butterfly computation circuit is preformed by addition of the shifters 241 and 242 to the combination used in the orthogonal transform unit 20 of FIG. 4 with the switch 211 of FIG. 4 changed to the switch 212 in FIG. 11.

FIG. 12 is a block diagram of a third embodiment of this invention, which is an 8 valued Walsh transform unit for obtaining a matrix A of Eq. (1) through direct multiplications and additions according to a method similar to DFT (Discrete Fourier Transform). It should be noted in connection with the following that symbols k, i, and $k_i$ are used and that these symbols are related neither to the suffix i used in the expression $x_i$ nor to the signals k and i described in connection with FIGS. 3 through 11. Assuming now that an element in the k-th row of the i-th column of the matrix A of Eq. (1) is $a_{ki}$, and $X = (x_0, x_1, \ldots, x_i, \ldots, x_{2n-1})$, a multiple valued Walsh spectrum $WM_k$ is obtainable by getting a product sum of $a_{ki}$ and input time series $x_i$ as:

$$WM_k = \sum_{i=0}^{2n-1} a_{ki} \cdot x_i \quad (33)$$

Here, since $A = P_1 \cdot P_2 \ldots \cdot P_n$, $a_{ki}$ is one of 8 pieces (1, $1+j$, $j$, $-1+j$, $-1$, $-1-j$, $-j$, $1-j$) shown in FIG. 2A in the case of the 8.valued Walsh transform. To describe concretely, $a_{ki}$ is determined by Eq. (34).

$$a_{ki} = a_{[k \cdot i]} \tag{34}$$

where $[k \cdot i]$ is the remainder of $k_i$ divided by 8. That is, $$a_0 = 1, \ a_1 = 1+j, \ a_2 = j, \ a_3 = -1+j, \ a_4 = -1,$$
$$a_5 = -1-j, \ a_6 = -j, \ a_7 = 1-j.$$

Consequently, the operation of the product in Eq. (33) can be performed by an adder and a subtracter.

At the beginning, a signal $Cl_1$ from a control unit 31 clears accumulators 261 and 262 according to a time chart shown in FIG. 13. Then consecutively, an input time series data $x_i$ is read in sequence out of a buffer memory 11 according to a signal i changing from 0 to $2^n - 1$. Here, an orthogonal transformation multiple valued Walsh transform unit 22 comprises a real part accumulator 261 and an imaginary part accumulator 262, a real part operator 251 and an imaginary part operator 252, and a switch 213 for inputting the data $x_i$ or zero to the real part operator 251 or the imaginary part operator 252. The orghogonal transformer unit 22 operates in the following eight ways according to a signal $k_i$ from the control unit 31. As shown in FIG. 14, the operation (addition or subtraction) of the operators 251 and 252 having a configuration shown in FIG. 6 is selected in accordance with the signal $k_i$. If contents of the real part accumulator 261 and the imaginary part accumulator 262 are $ACC_R$ and $ACC_I$ respectively, then $$\begin{cases} ACC_R + x_i \to ACC_R \\ ACC_I + 0 \to ACC_I \end{cases}$$

when $a_{ki} = 1$,

In other words, results of $ACC_R + x_i$ and $ACC_I + 0$ are written into the accumulators 261 and 262, respectively. The switch 213 and the operators 251 and 252 are controlled to carry out the following arithmetic operations:

$$\begin{cases} ACC_R + x_i \to ACC_R \\ ACC_I + x_i \to ACC_I \end{cases}$$

when $a_{ki} = 1 + j$ $$\begin{cases} ACC_R + 0 \to ACC_R \\ ACC_I + x_i \to ACC_I \end{cases}$$

when $a_{ki} = j$ $$\begin{cases} ACC_R - x_i \to ACC_R \\ ACC_I + x_i \to ACC_I \end{cases}$$

when $a_{ki} = -1 + j$ $$\begin{cases} ACC_R - x_i \to ACC_R \\ ACC_I + 0 \to ACC_I \end{cases}$$

when $a_{ki} = -1$ $$\begin{cases} ACC_R - x_i \to ACC_R \\ ACC_I - x_i \to ACC_I \end{cases}$$

when $a_{ki} = -1 - j$ $$\begin{cases} ACC_R + 0 \to ACC_R \\ ACC_I - x_i \to ACC_I \end{cases}$$

when $a_{ki} = -j$ $$\begin{cases} ACC_R + x_i \to ACC_R \\ ACC_I - x_i \to ACC_I \end{cases}$$

when $a_{ki} = 1 - j$

When the suffix i becomes $2^n - 1$, a real part $WM_{kR}$ and an imaginary part $WM_{kI}$ of $WM_k$, each of which is a k-degree term of the multiple valued Walsh spectrum, are obtained in the accumulators 261 and 262, respectively. The above example refers to a case where the datum X has only a real component. However, it is apparent that the above-mentioned other example will be applicable to the case of complex number input signal.

Next, the fourth embodiment relates to a 16 valued Walsh transformer for obtaining directly a product sum of the $a_{ki}$ and the input time series $x_i$ according to Eq. (33). $a_{ki}$ of Eq. (33) is one of sixteen pieces (1, $1+\frac{1}{2}j$, $1+j$, $\frac{1}{2}+j$, $j$, $-\frac{1}{2}+j$, $-1+j$, $-1+\frac{1}{2}j$, $-1$, $-1-\frac{1}{2}j$, $-1-j$, $-\frac{1}{2}-j$, $-j$, $\frac{1}{2}-j$, $1-j$, $1-\frac{1}{2}j$) shown in FIG. 2B in the case of the 16 valued Walsh transform. The product of Eq. (33) is obtainable by shifters and operators (adder and subtracter), $a_{ki}$ is determined according to Eq. (35) as in a case of Eq. (34).

$$a_{ki} = a_{[k \cdot i]} \tag{35}$$

where $[k \cdot i]$ is the remainder from generated when dividing $k_i$ by 16.

$a_0 = 1$, $a_1 = 1 + \frac{1}{2}j$, $a_3 = 1+j$, $a_4 = \frac{1}{2}+j$, $a_5 = j$,
$a_6 = -\frac{1}{2}+j$, $a_7 = -1+j$, $a_8 = -1+\frac{1}{2}j$, $a_8 = -1$,
$a_9 = -1-\frac{1}{2}j$, $a_{10} = -1-j$, $a_{11} = -\frac{1}{2}-j$, $a_{12} = -j$,
$a_{13} = \frac{1}{2}-j$, $a_{14} = 1-j$, $a_{15} = 1-\frac{1}{2}j$.

Figures 15, 16:
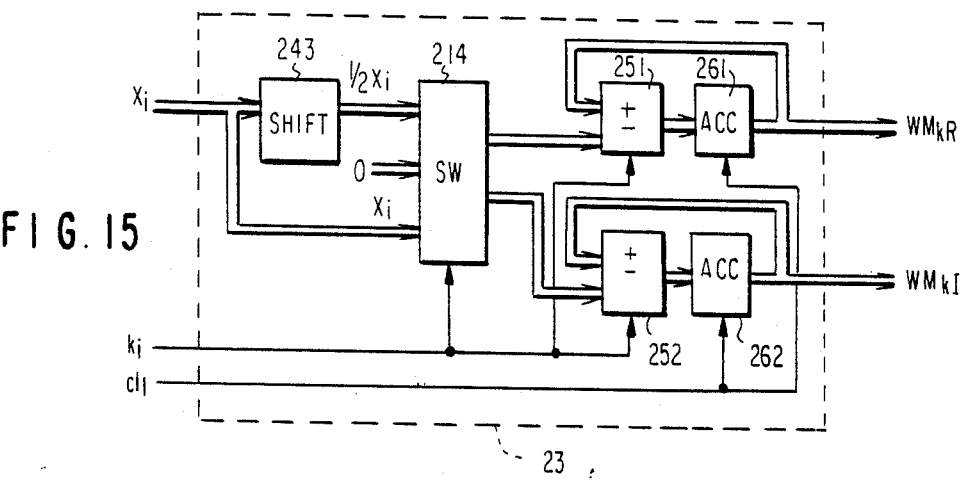
FIG. 15 is a detailed block diagram representing a fourth example of the orthogonal transform unit of FIG. 3.
FIG. 16 is a drawing showing the relation between the input and operation functions of the operators 251 and 252 in FIG. 15.

A multiple valued Walsh transform unit 23 in this embodiment has a shifter 243 in front of a switch 214 as shown in FIG. 15. The unit 23 operates in the following sixteen ways according to signals $k_i$ and $Cl_1$ from the control the control unit 31 as in the case of the third embodiment. That is, the kind of arithmetic function (addition or subtraction) of the operators 251 and 252 is selected according to the signal $k_i$ as shown in FIG. 16.

The switch 214 and the shifter 243 and the operators 251 and 252 are controlled for the following arithmetic operations:

$$\begin{cases} ACC_R + x_i \to ACC_R \\ ACC_I + 0 \to ACC_I \end{cases}$$

when $a_{ki} = 1$ $$\begin{cases} ACC_R + x_i \to ACC_R \\ ACC_I + \frac{1}{2}x_i \to ACC_I \end{cases}$$

when $a_{ki} = 1 + \frac{1}{2}j$ $$\begin{cases} ACC_R + x_i \to ACC_R \\ ACC_I + x_i \to ACC_I \end{cases}$$

when $a_{ki} = 1 + j$ $$\begin{cases} ACC_R + \tfrac{1}{2}x_i \to ACC_R \\ ACC_I + x_i \to ACC_I \end{cases}$$

when $a_{ki} = \tfrac{1}{2} + j$ $$\begin{cases} ACC_R + 0 \to ACC_R \\ ACC_I + x_i \to ACC_I \end{cases}$$

when $a_{ki} = j$ $$\begin{cases} ACC_R - \tfrac{1}{2}x_i \to ACC_R \\ ACC_I + x_i \to ACC_I \end{cases}$$

when $a_{ki} = -\tfrac{1}{2} + j$ $$\begin{cases} ACC_R - x_i \to ACC_R \\ ACC_I + x_i \to ACC_I \end{cases}$$

when $a_{ki} = -1 + j$ $$\begin{cases} ACC_R - x_i \to ACC_R \\ ACC_I + \tfrac{1}{2}x_i \to ACC_I \end{cases}$$

when $a_{ki} = -1 + \tfrac{1}{2}j$ $$\begin{cases} ACC_R - x_i \to ACC_R \\ ACC_I + 0 \to ACC_I \end{cases}$$

when $a_{ki} = -1$ $$\begin{cases} ACC_R - x_i \to ACC_R \\ ACC_I - \tfrac{1}{2}x_i \to ACC_I \end{cases}$$

when $a_{ki} = -1 - \tfrac{1}{2}j$ $$\begin{cases} ACC_R - x_i \to ACC_R \\ ACC_I - x_i \to ACC_I \end{cases}$$

when $a_{ki} = -1 - j$ $$\begin{cases} ACC_R - \tfrac{1}{2}x_i \to ACC_R \\ ACC_I - x_i \to ACC_I \end{cases}$$

when $a_{ki} = -\tfrac{1}{2} - j$ $$\begin{cases} ACC_R + 0 \to ACC_R \\ ACC_I - x_i \to ACC_I \end{cases}$$

when $a_{ki} = -j$ $$\begin{cases} ACC_R + \tfrac{1}{2}x_i \to ACC_R \\ ACC_I - x_i \to ACC_I \end{cases}$$

when $a_{ki} = \tfrac{1}{2} - j$ $$\begin{cases} ACC_R + x_i \to ACC_R \\ ACC_I - x_i \to ACC_I \end{cases}$$

when $a_{ki} = 1 - j$ $$\begin{cases} ACC_R + x_i \to ACC_R \\ ACC_I - \tfrac{1}{2}x_i \to ACC_I \end{cases}$$

when $a_{ki} = 1 - \tfrac{1}{2}j$

The shifter 243 outputs $\tfrac{1}{2}x_i$. When the signal i becomes $2^n - 1$, a real part $WM_{kR}$ and a imaginary part $WM_{kI}$ of the multiple Walsh spectrum $WM_{kI}$ are obtained in the accumulators 261 and 262, respectively.

Reviewing FIGS. 1 and 12 through 16, the switch 213 serves as a selecting circuit responsive to a control signal $k_i$ for selecting two input signals for the real and the imaginary part operators 251 and 252 from a zero signal and a read-out signal read out of the buffer memory 11 to represent one $x_i$ of data of the input datum X that is specified by the control unit 31. Similarly, a combination of the shifter 243 and the switch 214 serves as a selecting circuit. Responsive to the read-out signal representative of each datum $x_i$, the shifter 243 produces a shifted signal representative of a half of the datum, namely, $x_i/2$. The switch 214 selects the two input signals from the zero signal, the read-out signal, and the shifted signal. Like in FIGS. 3 through 11, the control signal is used on varying the absolute value for the twiddle factors.

The invention has been described as above with reference to the embodiments, however, the description does not necessarily limit the scope of this invention. Particularly in the embodiments of this invention, the method comprises, as the FFT algorithm, rearranging the input time series in an inverse binary order, multiplying each datum of the input time series by $P_I$ to $P_n$, thus obtaining a result in regular order, however, it is apparent that a method for obtaining the result in inverse binary order through multiplying the input time series straight in that order from $P_n^T$ to $P_I^T$ can be employed. The 8 valued and 16 valued Walsh transforms have been described above. However, a multiple valued Walsh twiddle factor on a unit square around an origin shown in FIGS. 2A and 2B, such as on 32-value, 64-value, is also conceivable, and these can be obtained apparently by an adder, a subtracter and a shifter.

Now, an application of the above-described orthogonal transformer to a signal analysis apparatus will be described.

The orthogonal transform can be used instead of a Fourier transform employed widely. The mulitple valued Walsh transform is useful as the orthogonal transform. Therefore, this embodiment refers to an analyzer for obtaining cepstral information which is a feature parameter of voice signal. The multiple valued Walsh transform will hereafter be called a multiple Walsh transform merely for brevity of the description.

As generally known, a voice signal G(t) is expressed in convolution of an impluse response R(t) of a vocal tract and a sound source waveform S(t) as set forth in Eq. (36).

$$G(t) = R(t) * S(t) \tag{36}$$

(* denoting a convoluting operation) Eq. (37) is derived by subjecting Eq. (36) to the Fourier transform:

$$G_f(\omega) = R_f(\omega) \times S_f(\omega) \tag{37}$$

The sound source characteristic $S_f(\omega)$ is an envelope of a periodic linear spectrum, and the vocal tract characteristic $R_f(\omega)$ is an envelope of the sound spectrum $G_f(\omega)$.

Eq. (38) represents the further log transform of Eq. (37):

$$\log |G_f(\omega)| = \log |R_f(\omega)| + \log |S_f(\omega)| \tag{38}$$

A cepstrum shown in Eq. (39) is obtained through the inverse Fourier transform of Eq. (39).

$$G_c(q) = R_c(q) + S_c(q) \tag{39}$$

As shown in Eq. (39), the product in a spectrum domain becomes a sum in a cepstrum domain. The cepstrum $S_c(q)$ of the periodic line spectrum which is the sound source spectrum appears only near $T_p$, the sound source period. On the other hand, the vocal tract spectrum $R_f(\omega)$ is expressed as an envelope of $G_f(\omega)$, and its cepstrum $R_c(q)$ appears at a low quefrency region. Namely, through the cepstral analysis, the vocal tract characteristic can be separated from the sound source characteristic.

The cepstral analysis is useful for data compression. However, a multiplier for Fourier transform has been required. On the other hand, a Walsh transform does not require a multiplier. However, there remains a problem with the deterioration approximation.

The invention employs the multiple Walsh transform (MWT) apparatus as mentioned instead of the Fourier transform and the inverse Fourier transform apparatuses. This embodiment of the present invention further provides a frequency extraction unit and a scale transform unit. The frequency extraction unit extracts a frequency component in a transmission band only from the sound spectrum and shifts the extracted frequency to zero frequency to remove an influence of characteristics outside the transmission band. The scale transform unit scale-transforms a frequency axis according to a mapping function to compress higher frequency information by the log scale transform and Mel scale transform, for example, thereby obtaining a transformed cepstrum having a characteristic close to the human aural characteristic.

Figure 17:
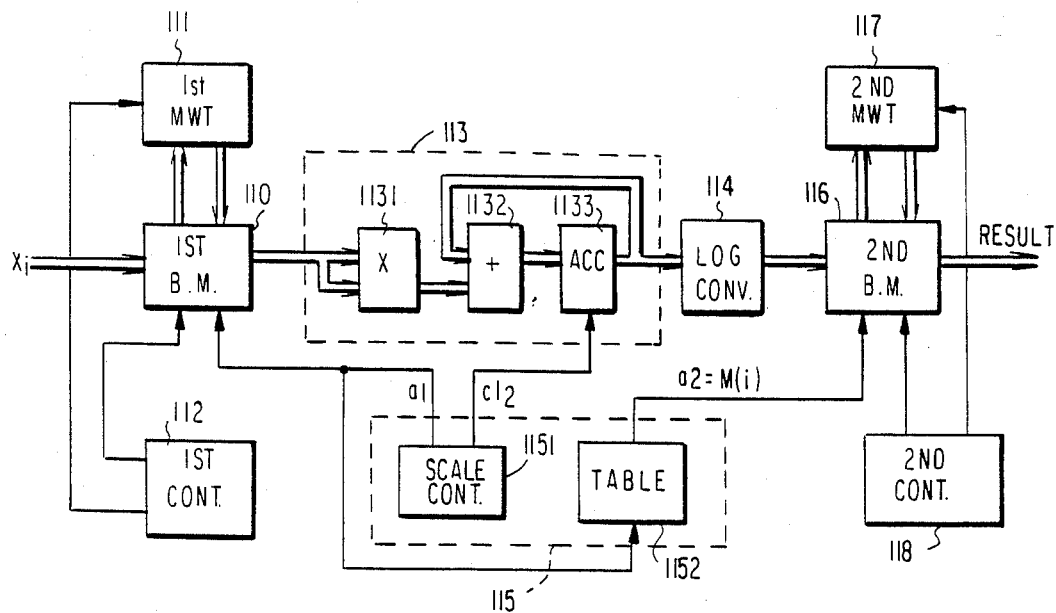
FIG. 17 is a block diagram of a cepstral analyzer for which the orthogonal transformer of this invention is applied.

An example of the configuration of this embodiment is shown in FIG. 17. For operation, input time series data is inputted to a first buffer memory 110 and stored temporarily therein. A first multiple Walsh transform (MWT) unit 111 performs the above-mentioned multiple Walsh transform according to this invention by using data read out of the first buffer memory 110 under control signals (same signals as the signal used in each embodiment described above) from a first control unit 112, and a Walsh spectrum $WM_i$ finally obtained and is stored in the first buffer memory 110.

Figure 18:
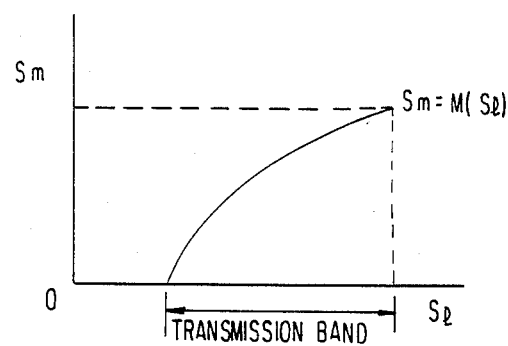
FIG. 18 is a diagram illustrating a mapping function in FIG. 17.
Figure 19:
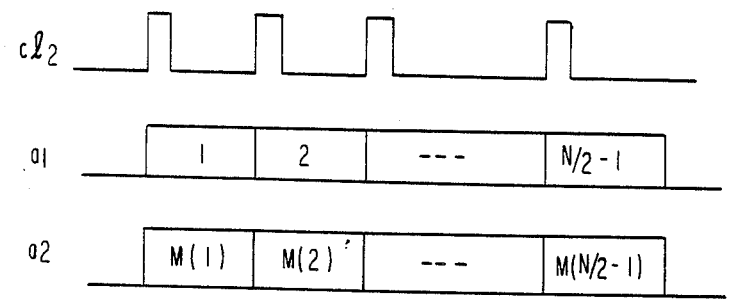
FIG. 19 is a timing chart of the unit shown in FIG. 17.

A log power multiple Walsh spectrum is obtained from the Walsh spectrum $WM_i$ through a power spectrum measuring unit 113 and a log transform unit 114. A scale transform unit 115 carries out a scale transform according to a mapping function $Sm = M(S_l)$. The scale transform is an operation for rearranging the data in the transmission band to a Mel scale according to the mapping function $Sm = M(S_l)$ as shown in FIG. 18, namely transforming $S_l$-th spectrum to $Sm$-th spectrum. More specifically, a scale transform control unit 1151 generates control signals $cl_2$, $a_1$ according to a time chart shown in FIG. 19. The real part $WM_{Ri}$ and the imaginary part $WM_{Ii}$ of the multiple Walsh spectrum $WM_i$ are read out sequentially from the first buffer memory 110 in response to the signal $a_1$, and squared by a multiplier 1131 in the power spectrum measuring unit 113. A power multiple Walsh spectrum $(P_i = WM_{Ri}^2 + WM_{Ii}^2)$ is obtained by means of an adder 1132 and an accumulator 1133, which is then subjected to log transform in the log transform unit 114. The log power multiple Walsh spectrum (log Pi) is stored at an M(i) address in a second buffer memory 116, M(i) being read out of a mapping function table memory unit 1152 in response to the signal $a_1$ as an address signal $a_2$ of the second buffer memory 116. A multiple Walsh transform in a second multiple Walsh transform unit 117 is operated similarly to the transform of the first orthogonal transform division 111, which is executed by using data from the second buffer memory 116 under the control of a second control unit 118. A timing relation of the signals $cl_2$, $a_1$, $a_2$ is shown in FIG. 19.

Normally, only a low-order term of the cepstrum domain is used for speech recognition. Therefore, the second-multiple Walsh transform calculates only the low-order term (for a small k) of a transform matrix of the multiple Walsh transform equation:

$$W_k = \sum_{l=0}^{N-1} H_{kl} \cdot X_l \tag{40}$$

Since $X_l$ is an even function, $H'_{kl}$ which is a real part of $H_{kl}$ can be used. It should be understood that the letter k is what is used hereinabove as the suffix to the multiple Walsh spectrum and has no relation to the signal k described in connection with FIGS. 3 through 11 and that the letter l is used in the suffixes merely for convenience and has no relation to the predetermined integer used in defining the twiddle factors.

$$W_k = \sum_{l=0}^{N-1} H'_{kl} \cdot X_l \tag{41}$$

Figure 20:
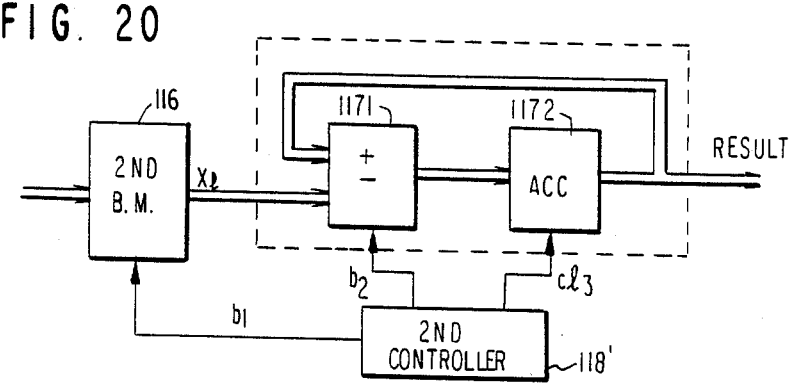
FIG. 20 is a block diagram representing another configuration of the orthogonal transform unit in FIG. 17.
Figure 21:
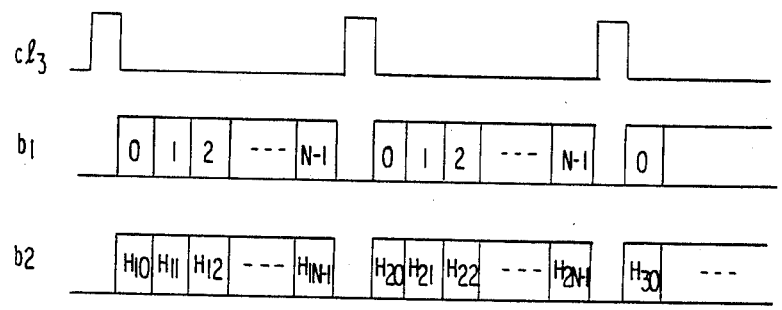
FIG. 21 is a timing chart of the unit shown in FIG. 20.

Another embodiment for obtaining cepstrum information refers to an apparatus based on the Walsh transform according to Eq. (41). A configuration of a second multiple Walsh transform unit according to this embodiment is known in FIG. 20. A second control unit 118' generates control signals $cl_3$, $b_1$, $b_2$ according to a time chart shown in FIG. 21. The signal $Cl_3$ clears an accumulator 1172. A modified log power multiple Walsh spectrum $X_l = \log P_{M(l)}$ is read out of the second buffer memory 116 according to a signal $b_1$. An operator 1171 carries out addition or subtraction according to a signal $b_2$ of $+1$ or $-1$ conforming to a real part $H'_{kj}$ of the multiple Walsh transform matrix. The accumulator 1172 accumulates the output of the operator 1171. That is, $ACC + X_j \rightarrow ACC$ is carried out when the signal $b_2$ indicates $+1$, and $ACC - X_j \rightarrow ACC$ is carried out when the signal $b_2$ indicates $-1$. When signal $b_1$ becomes $N-1$, a Walsh transform value $W_k$ or pseudo cepstrum is obtainable from the accumulator 1172.

It is then apparent that the above-mentioned transforming means shown in FIGS. 4 and 10 can be used otherwise as the first and second orthogonal transform (multiple Walsh transform) units 111 and 117. Further in the embodiments of this invention, the input time series is arranged in an inverse binary order as an algorithm of FWT and so obtained through calculating the product in sequence from $P_1$ to $P_n$. However, it is apparent that a method for obtaining a Walsh spectrum W' in an inverse binary order can consequently be employed throguh calculating the product in sequence from $P_n^T$ to $P_1^T$ for time series X' in normal order as shown in Eq. (42)

$$W' = G_1^T \cdot G_2^T \cdot \ldots G_n^2 \cdot X' \qquad (42)$$

Then, the power spectrum is obtained as $P_i = W_{wi}^2 + W_{wi+1}^2$, however, it is also apparent that a method for obtaining the power spectrum approximately as the sum of absolute values like $P_i = |W_{2i}| + |W_{2i+1}|$ can be employed, because no multiplier is required in this case.

What is claimed is

1. An orthogonal transformer, comprising: a buffer memory (10 or 11) for memorizing input time series data temporarily; an orthogonal transform means (20, 21, 22 or 23) for carrying out an orthogonal transform operation by multiplying each of the data read out of said buffer memory by predetermined twiddle factors; and a control means (30 or 31) for specifying the data read out of said buffer memory and for making a real and an imaginary part of each of said twiddle factors have a first and a second absolute value, respectively, with said first absolute value varied in accordance with a formula $r/2^l$ when said second absolute value is equal to one and with said second absolute value varied in accordance with the formula $r/2^l$ when said first absolute value is equal to one (l being a predetermined integer which is not negative, and r being integers between 0 and $2^l$, both inclusive).

2. The orthogonal transformer as defined in claim 1, wherein: said orthogonal transform means (20 or 21) comprises first reading means (201 and 202) responsive to a read signal for reading a first datum out of the data memorized in said buffer memory, second reading means (203 and 204) responsive to said read signal for reading a second datum out of the data memorized in said buffer memory, and butterfly computation means (211 or 212, 221, 222, and 231 to 234) for processing butterfly computation with said twiddle factors on said first and said second data to produce butterfly processed data; said control means producing said read signal on specifying the data read out of said buffer memory.

3. The orthogonal transformer as defined in claim 2, said first datum being represented by a first real component signal and a first imaginary component signal, said second datum being represented by a second real component signal and a second imaginary component signal, said predetermined integer being equal to zero, wherein: said butterfly computation means (20) comprises: a switch (211) responsive to a control signal for selecting two pairs of predetermined signals from said second real and imaginary component signals and a zero signal; a first operator means (221) for subjecting one of said two pairs to one of addition, subtraction, and sign inversion after addition that is selected by said control signal; a second operator means (222) for subjecting the other of said two pairs to one of addition and subtraction that is selected by said control signal; and a combination of two adders (231 and 232) and two subtracters (233 and 234) for processing said first real and imaginary component signals and outputs of said first and said second operator means into said butterfly processed data; said control means producing said control signal on varying said absolute value.

4. The orthogonal transformer as defined in claim 2, said first datum being represented by a first real component signal and a first imaginary component signal, said second datum being represented by a second real component signal and a second imaginary component signal, said second real and imaginary component signals being represented each by a plurality of binary bits, said predetermined integer being equal to one, wherein, said butterfly computation means comprises: first and second shifters (241 and 242) for shifting the binary bits of said second real and imaginary component signals rightward by one bit to produce a shifted real component signal and a shifted imaginary component signal; a switch (212) responsive to acontrol signal for selecting two pairs of predetermined signals from said second real and imaginary component signals, said shifted real and imaginary component signals, and a zero signal; a first operator means (221) for subjecting one of said two pairs to one of addition, subtraction, and sign inversion after addition that is selected by said control signal; a second operator means (222) for subjecting the other of said two pairs to one of addition and subtraction that is selected by said control signal; and a combination of two adders (231 and 232) and two subtracters (233 and 234) for processing said first real and imaginary component signals and outputs of said first and said second operator means into said butterfly processed data; said control means producing said control signal on varying said absolute value.

5. The orthogonal transformer as defined in claim 1 and operable successively in a first through an N-th stage to produce a result of said orthogonal transform operation at the N-th stage, where N represents a predetermined natural number, wherein: said orthogonal transform means (23 or 24) comprises a first accumulator (261) for accumulating a first processed signal of an n-th stage, where n is variable from one to N, a second accumulator (262) for accumulating a second processed signal of the n-th stage, a first operator means (251) responsive to a control signal for subjecting a first input signal and the first processed signal of said n-th stage to one of addition and subtraction that is specified by said control signal, a second operator means (252) responsive to said control signal for subjecting a second input signal and the second processed signal of said n-th stage to one of addition and subtraction that is specified by said control signal, and a selecting means (213 or 243 and 214) responsive to said control signal for selecting said first and said second input signal from a zero signal and a read-out signal read out of said buffer memory to represent one of said data that is specified by said control means at a time, said first and said second operator means thereby producing the first and the second processed signal of the (n+1)-th stage for storage in said first and said second accumulators, respectively; said control means producing said control signal on varying said absolute value.

6. The orthogonal transformer as defined in claim 5, said predetermined integer being equal to zero, wherein said selecting means comprises a switch (213) responsive to said control signal for selecting said first and said second input signals from said zero signal and said read-out signal.

7. The orthogonal transformer as defined in claim 5, said predetermined integer being equal to one, wherein said selecting means comprises a shifter (243) for shifting said read-out signal into a shifted signal and a switch (214) responsive to said control signal for selecting said first and said second input signals from said zero signal, said read-out signal, and said shifted signal.

8. An apparatus, comprising: a buffer memory (110) for memorizing an input time series data temporarily; a first orthogonal transform means (111) for carrying out an orthogonal transform operation by multiplying each of data read out of said buffer memory by predetermined twiddle factors; a control means (112) for specifying the data read out of said buffer memory and for making a real and an imaginary part of each of said twiddle factors have a first and a second absolute value, respectively with said first absolute value varied in accordance with a formula $r/2^l$ when said second absolute value is equal to one and with said second absolute value varied in accordance with the formula $r/2^1$ when said first absolute value is equal to one (l being a predetermined integer which is not negative and r being integers between 0 and $2^l$ both inclusive); and a second orthogonal transform means (117) for subjecting an output of said first orthogonal transform means to a predetermined orthogonal transform operation.

9. An apparatus according to claim 8, further comprising a scale transforming means (115) for subjecting the output of said first orthogonal transform means to a predetermined scale transformation, and for supplying the result to said second orthogonal transform means (117).

10. The apparatus according to claim 9, wherein said second orthogonal transform means comprises a buffer memory (116) for temporarily memorizing the result obtained by said scale transforming means, an orthogonal transform means (117) for carrying out said predetermined orthogonal transform operation by multiplying each of data read out of the buffer memory of said second orthogonal transform means by predetermined twiddle factors, a control means (118) for selecting the last-mentioned data out of the result memorized in the buffer memory of said second orthogonal transform means and for making a real and an imaginary part of each of the last-mentioned twiddle factors have a first and a second absolute value, respectively, with the last-mentioned first absolute value varied in accordance with a formula $r/2^l$ when the last-mentioned second absolute value is equal to one and with the last-mentioned second absolute value varies in accordance with the formula $r/2^1$ when said last-mentioned first absolute value is equal to one (l being a predetermined integer which is not negative, and r being integers between 0 and $2^l$, both inclusive).

11. The apparatus according to claim 9, the result obtained by said scale transforming means consisting of a plurality of terms numbered from zero, wherein said second transform means is supplied with only the terms numbered from zero up to a predetermined number.

12. The apparatus according to claim 9, further comprising a means for obtaining a power spectrum of the output of said first orthogonal transform output.

13. The apparatus according to claim 9, wherein said scale transforming means comprises at least one transforming means of a log transforming means and a Mel transforming means.

14. The orthogonal transformer as defined in claim 8, wherein said twiddle factors are given as: $1, 1+j, j, -1+j, -1, -1-j, -j, 1-j$.

15. The orthogonal transformer as defined in claim 8, wherein said twiddle factors are given as: $1, 1+\frac{1}{2}j, 1+j, \frac{1}{2}+j, j, -\frac{1}{2}+j, -1+j, -1+\frac{1}{2}j, -1, -1-\frac{1}{2}j, -1-j, -\frac{1}{2}-j, \frac{1}{2}-j, 1-j, 1-\frac{1}{2}j$.

* * * * *

UNITED STATES PATENT AND TRADEMARK OFFICE
CERTIFICATE OF CORRECTION

PATENT NO. : 4,839,844
DATED : June 13, 1989
INVENTOR(S) : Masao Watari

It is certified that error appears in the above-identified patent and that said Letters Patent is hereby corrected as shown below:

Column 3, line 55, after "where", insert --*--.

Column 5, line 30, after "$a_i{}^x$", delete "=".

Column 5, line 58, after "below", insert --Eq.--.

Column 6, line 23, after "$-\frac{1}{2}-j,$", insert -- -j, --.

Column 8, line 4, delete "FIG.6", and insert --FIG. 4--.

Column 8, line 18, delete "+jK$_{jx}$)", and insert --+jX$_{jx}$)--.

Column 15, line 20, delete "quefrency", and insert --frequency--.

Column 17, line 3, delete "throguh", and insert --through--.

Column 20, line 34, after "$-\frac{1}{2}-j,$", insert -- -$_j$, --.

Signed and Sealed this

Ninth Day of April, 1991

Attest:

HARRY F. MANBECK, JR.

Attesting Officer

Commissioner of Patents and Trademarks